(12) United States Patent
Mori

(10) Patent No.: US 11,696,040 B2
(45) Date of Patent: Jul. 4, 2023

(54) IMAGE PROCESSING APPARATUS THAT RETOUCHES AND DISPLAYS PICKED-UP IMAGE, IMAGE PROCESSING METHOD, AND STORAGE MEDIUM

(71) Applicant: CANON KABUSHIKI KAISHA, Tokyo (JP)

(72) Inventor: Shingo Mori, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/898,523

(22) Filed: Aug. 30, 2022

(65) Prior Publication Data

US 2022/0417427 A1 Dec. 29, 2022

Related U.S. Application Data

(63) Continuation of application No. 16/810,083, filed on Mar. 5, 2020, now Pat. No. 11,463,619.

(30) Foreign Application Priority Data

Mar. 13, 2019 (JP) ................................ 2019-046165

(51) Int. Cl.
*H04N 23/80* (2023.01)
*G06T 11/60* (2006.01)
*H04N 23/63* (2023.01)

(52) U.S. Cl.
CPC ............. *H04N 23/80* (2023.01); *G06T 11/60* (2013.01); *H04N 23/631* (2023.01)

(58) Field of Classification Search
CPC ......... H04N 5/23229; H04N 5/232933; H04N 5/232122; H04N 5/232939;
(Continued)

(56) References Cited

U.S. PATENT DOCUMENTS 7,423,658 B1 9/2008 Uomori et al.
8,654,153 B2 2/2014 Okamoto
(Continued)

FOREIGN PATENT DOCUMENTS

JP 2001209827 A 8/2001
JP 2005-156356 A 6/2005
(Continued)

OTHER PUBLICATIONS

Notice of Reasons for Refusal issued by the Japan Patent Office dated Nov. 29, 2022 in corresponding JP Patent Application No. 2019-046165, with English translation.

*Primary Examiner* — Michael S Osinski
(74) *Attorney, Agent, or Firm* — Carter, DeLuca & Farrell LLP

(57) ABSTRACT

An image processing apparatus which superimposes an indicator image on a picked-up image, with inhibition of a subject from deteriorating in visibility. At least one processor of the image processing apparatus executes the set of instructions to: specify two points of a subject in a picked-up image; acquire three-dimensional positional information about the two points; detect a change about a state of the image processing apparatus; generate an indicator image corresponding to a length between the two points and the change, based on the three-dimensional positional information and the change; and superimpose the indicator image onto the picked-up image, to acquire a retouched image.

15 Claims, 10 Drawing Sheets

(58) Field of Classification Search
CPC ......... H04N 5/23293; H04N 5/232945; H04N 5/23296; H04N 17/002; H04N 5/232123; H04N 5/23216; H04N 5/23218; H04N 5/23219; H04N 5/23222; H04N 23/80; H04N 23/631; H04N 23/633; H04N 23/672; G06T 11/60; G06T 7/571; G06T 11/00; G06T 19/006; G06T 19/00; G06T 2207/10016; G06T 2207/10028; G06T 2207/20101; G06T 2207/30204; G06T 7/11; G06T 7/80; G06F 3/011; G06F 3/0304; G06F 3/0482; G06F 3/04883; G02B 2027/014; G02B 2027/0138; G02B 27/017; G02B 7/102

See application file for complete search history.

(56) References Cited

U.S. PATENT DOCUMENTS

| | | |
|---|---|---|
| 8,780,177 B2 | 7/2014 | Eccles et al. |
| 9,298,884 B1 | 3/2016 | Ahmad |
| 9,383,626 B2 | 7/2016 | Mizukami |
| 10,445,936 B1 | 10/2019 | Charlton et al. |
| 10,664,903 B1 | 5/2020 | Haitani et al. |
| 10,827,127 B2 | 11/2020 | Tsubusaki |
| 10,911,645 B2 | 2/2021 | Ikeda |
| 11,196,925 B2 | 12/2021 | Yaguchi |
| 2014/0096084 A1 | 4/2014 | Kwon et al. |
| 2015/0070389 A1 | 3/2015 | Goto et al. |
| 2015/0269437 A1 | 9/2015 | Maruyama et al. |
| 2016/0040981 A1 | 2/2016 | Kang et al. |
| 2017/0289411 A1 | 10/2017 | Ikeda |
| 2017/0337705 A1 | 11/2017 | Bendall |
| 2018/0018079 A1 | 1/2018 | Monastyrshyn et al. |
| 2018/0089501 A1 | 3/2018 | Terekhov et al. |
| 2018/0241943 A1 | 8/2018 | Lee et al. |
| 2018/0321776 A1 | 11/2018 | Averyanov et al. |
| 2019/0051054 A1 | 2/2019 | Jovanovic et al. |
| 2019/0091869 A1 | 3/2019 | Yamazaki et al. |
| 2019/0215462 A1 | 7/2019 | Tsubusaki |
| 2021/0163270 A1 | 6/2021 | Kosaka et al. |
| 2022/0084374 A1 | 3/2022 | Dour et al. |
| 2022/0122326 A1 | 4/2022 | Reitmayr et al. |

FOREIGN PATENT DOCUMENTS

| | | |
|---|---|---|
| JP | 2009-071441 A | 4/2009 |
| JP | 2016009062 A | 1/2016 |

IMAGE PROCESSING APPARATUS THAT RETOUCHES AND DISPLAYS PICKED-UP IMAGE, IMAGE PROCESSING METHOD, AND STORAGE MEDIUM

CROSS REFERENCE TO RELATED APPLICATIONS

This application is a continuation of U.S. patent application Ser. No. 16/810,083, filed on Mar. 5, 2020, which claims the benefit of and priority to Japanese Patent Application No. 2019-046165, filed Mar. 13, 2019, each of which is hereby incorporated by reference herein in their entirety.

BACKGROUND OF THE INVENTION

Field of the Invention

The present invention relates to an image processing apparatus that retouches and displays a picked-up image, an image processing method, and a storage medium.

Description of the Related Art

There is a conventionally known image processing apparatus that displays a picked-up image including a subject picked up by an image pickup apparatus, such as a digital camera, on a display. For example, a digital camera that functions as the image processing apparatus, typically includes an electronic viewfinder (EVF) provided with an electronic display device, such as a liquid crystal display (LCD), as a display for verification of the picked-up subject.

There is a proposed technology of displaying length information about a subject, on a display on which the subject is being displayed, such that a user can recognize the length of the subject. According to the technology in Japanese Laid-Open Patent Publication (kokai) No. 2001-209827, on the basis of three-dimensional positional information about a subject, a scale image (ruler image) indicating the size of a portion specified by a user (specified position) is generated. Then, the scale image combined with the image of the subject is displayed, resulting in presentation of the size of the subject to the user.

A subject image displayed in a display image varies in accordance with various factors. For example, according to the configuration disclosed in Japanese Laid-Open Patent Publication (kokai) No. 2001-209827, when a display image is enlarged, the scale image (ruler image) superimposed thereon is also enlarged. As a result, the region in which the scale image and the subject overlap each other in the display screen, increases relatively. Thus, the subject in the display image deteriorates in visibility.

SUMMARY OF THE INVENTION

The present invention provides an image processing apparatus capable of superimposing an indicator image on a picked-up image, with inhibition of a subject from deteriorating in visibility, an image processing method, and a storage medium.

Accordingly, one aspect of the present invention provides an image processing apparatus including: a memory device that stores a set of instructions; and at least one processor that executes the set of instructions to: specify two points of a subject in a picked-up image; acquire three-dimensional positional information about the two points; detect a change about a state of the image processing apparatus; generate an indicator image corresponding to a length between the two points and the change, based on the three-dimensional positional information and the change; and superimpose the indicator image onto the picked-up image, to acquire a retouched image.

Accordingly, one aspect of the present invention provides an image processing apparatus including: a memory device that stores a set of instructions; and at least one processor that executes the set of instructions to: specify two points of a subject in a picked-up image; acquire three-dimensional positional information about the two points; detect a change about a position of the subject; generate an indicator image corresponding to a length between the two points and the change, based on the three-dimensional positional information and the change; and superimpose the indicator image onto the picked-up image, to acquire a retouched image.

Accordingly, one aspect of the present invention provides an image processing apparatus including: a memory device that stores a set of instructions; and at least one processor that executes the set of instructions to: specify two points of a subject in a picked-up image; acquire three-dimensional positional information about the two points; detect a change about a position of the subject; generate an indicator image corresponding to a length between the two points and the change, based on the three-dimensional positional information and the change; and superimpose the indicator image onto the picked-up image, to acquire a retouched image.

According to one aspect of the present invention, an indicator image can be superimposed on a picked-up image, with inhibition of a subject from deteriorating in visibility.

Further features of the present invention will become apparent from the following description of exemplary embodiments (with reference to the attached drawings).

DESCRIPTION OF THE EMBODIMENTS

Embodiments of the present invention will be described in detail below with reference to the accompanying drawings.

The embodiments to be described below are mere exemplary configurations enabling achievement of the present invention. The following embodiments can be appropriately modified or altered in accordance with the configuration of an apparatus to which the present invention is applied or various conditions. Therefore, the scope of the present invention is not limited to the configurations described in the following embodiments.

An image pickup apparatus 100 according to an embodiment below, including an image processing apparatus according to the present invention, can be applied to various electronic camera apparatuses, such as a digital still camera, a digital video camera, a monitoring camera, an industrial camera, and a medical camera. The image pickup apparatus 100 according to the present embodiment, is capable of acquiring distance information indicating the distance to a subject. A user of the image pickup apparatus 100 can grasp the size of the subject displayed on a display, such as an electronic viewfinder (EVF). The display may be integrally formed with or may be separately formed from the image pickup apparatus 100. It should be noted that the image processing function of the image pickup apparatus 100 according to the present embodiment, can be applied to various information processing apparatuses, such as a personal computer (PC), a smartphone, and a tablet terminal. For an information processing apparatus having no function of acquiring distance information, image processing according to the present embodiment can be applied to a picked-up image acquired by another apparatus.

Figure 1:
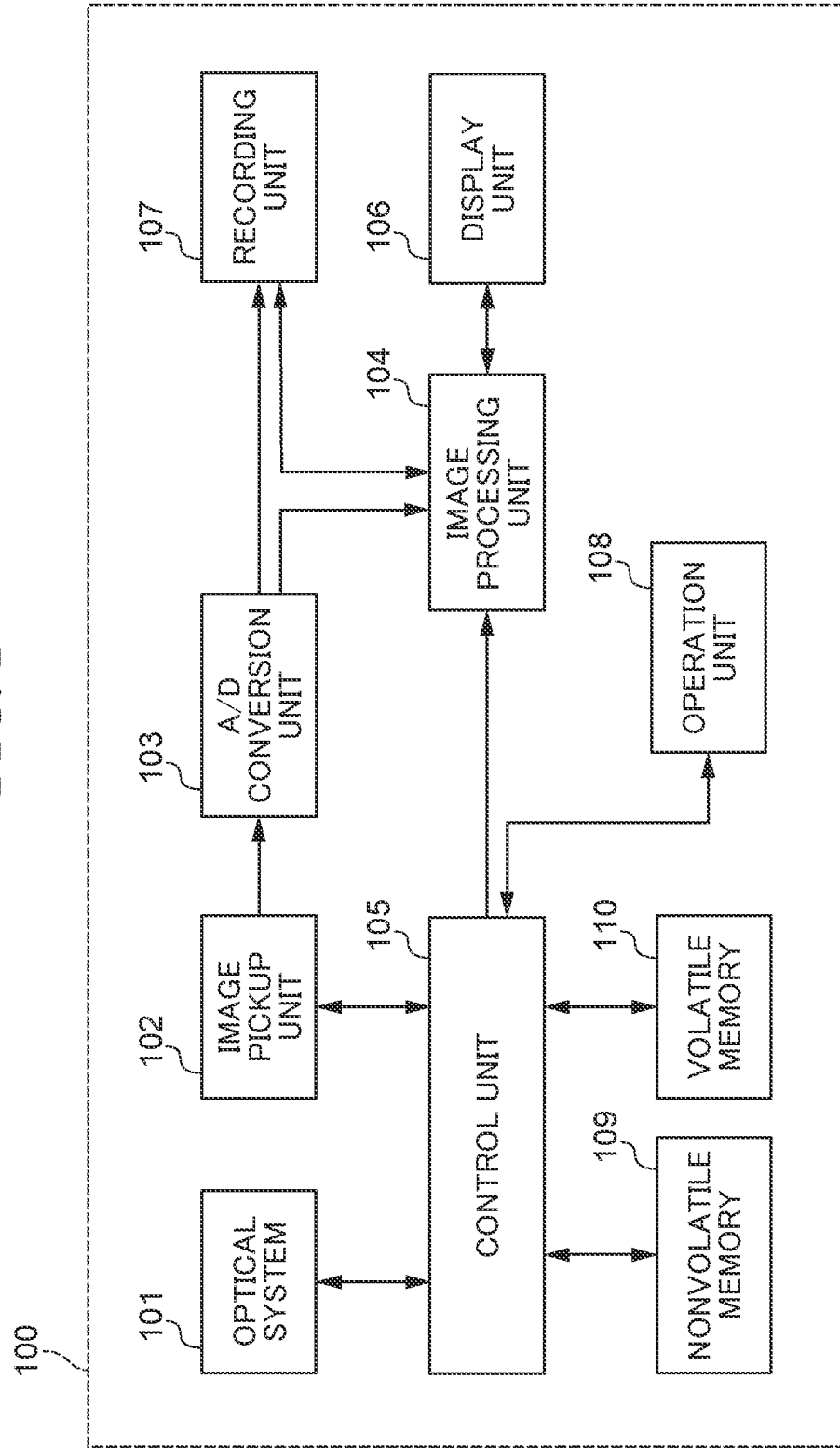
FIG. 1 is a configuration block diagram of the configuration of an image pickup apparatus according to a first embodiment of the present invention.

FIG. 1 is a configuration block diagram of the configuration of an image pickup apparatus 100 according to a first embodiment. The image pickup apparatus 100 includes an optical system 101, an image pickup unit 102, an A/D conversion unit 103, an image processing unit 104, a control unit 105, a display unit 106, a recording unit 107, an operation unit 108, a nonvolatile memory 109, and a volatile memory 110.

The optical system 101 is a taking lens including a lens unit including a zoom lens and a focus lens, an aperture adjuster, and a shutter. The optical system 101 forms the image of a subject onto the image pickup unit 102. The optical system 101 adjusts optical settings, such as the magnification, the point of focus, and the light quantity of the subject image to reach the image pickup unit 102. The optical system 101 may be detachably attachable to the image pickup apparatus 100 or may be integrated with the image pickup apparatus 100. In a case where the optical system 101 is detachably attachable, it can be understood that the optical system 101 is not a constituent element of the image pickup apparatus 100.

The image pickup unit 102 is an image sensor including a charge-coupled device (CCD) or a complementary metal oxide semiconductor (CMOS). The image pickup unit 102 includes a pixel 202 that photoelectrically converts a light beam having reached the image pickup unit 102 through the optical system 101, to generate an electric signal. The details of the image pickup unit 102 for use in acquisition of a picked-up image, will be given below.

The A/D conversion unit 103 is a conversion device that converts an analog electric signal (video signal) input from the image pickup unit 102, into a digital picked-up image. The A/D conversion unit 103 outputs the picked-up image after A/D conversion, to the image processing unit 104 and the recording unit 107.

The image processing unit 104 performs ordinary signal processing to the picked-up image, such as noise reduction processing, development processing, and gradation compression processing in which gradation compression for a predetermined output range is performed by gamma conversion. In addition, the image processing unit 104 performs image retouch processing according to the first embodiment, to be described below. The image processing unit 104 outputs the picked-up image processed as above, to the display unit 106 and the recording unit 107.

The control unit 105 is a controller including a processor, such as a central processing unit (CPU) or a micro processing unit (MPU). The nonvolatile memory 109 is a nonvolatile storage device that stores a program for control and data, and is, for example, a read only memory (ROM). The volatile memory 110 is a volatile storage device that functions as a working memory for the control unit 105, and is, for example, a random-access memory (RAM). The control unit 105 expands the program in the nonvolatile memory 109 into the volatile memory 110 and executes the expanded program, to control the operation of each block included in the image pickup apparatus 100. For example, the control unit 105 calculates the amount of exposure for acquisition of an appropriately bright input image, and then controls the optical system 101 and the image pickup unit 102 to control an aperture, shutter speed, the analog gain of the image sensor such that the calculated amount of exposure is achieved.

Under the control of the control unit 105, the display unit 106 causes a display or displays, such as an electronic viewfinder (EVF) or a liquid crystal display (LCD), to display the picked-up image output from the image processing unit 104. As described below, the display unit 106 is capable of displaying a retouched image including the picked-up image and an indicator image, on the display.

The recording unit 107 has a function of recording the picked-up image and image pickup information indicating image pickup conditions at the time of image picking-up (e.g., F-number and shutter speed). For example, the recording unit 107 may record the data onto an internal recording medium built in the image pickup apparatus 100 or may record the data onto an external recording medium detachably attachable to the image pickup apparatus 100. Examples of the external recording medium include a memory card equipped with a semiconductor memory and a package housing a rotatable recording medium, such as a magneto-optical disc.

The operation unit 108 has an operation interface function of receiving an operation of the user (e.g., specification instruction or change instruction). For example, the operation unit 108 may be a touch panel that functions as the display that displays the picked-up image, or may be a cross key for use in movement of a cursor displayed on the display. The user operates the operation unit 108, resulting in acquisition of coordinate information about the subject image on the picked-up image specified by the user. As described below, according to the first embodiment, it is assumed that the user specifies two points located at both ends of a portion that the user desires to measure in length.

Figure 2A:
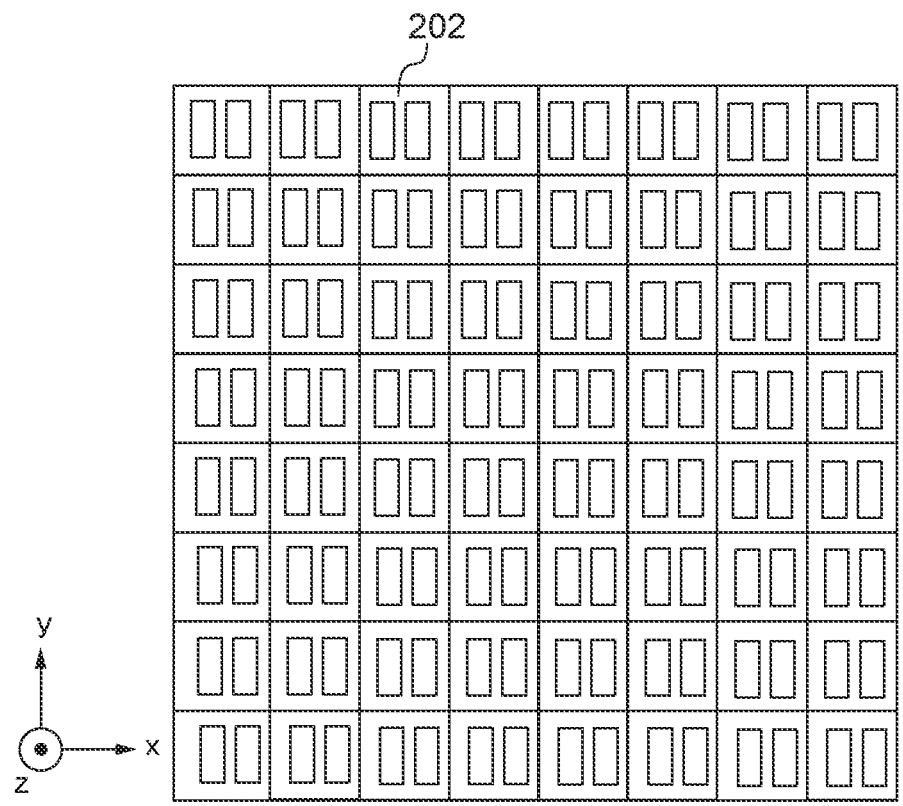
FIGS. 2A and 2B are explanatory views of the configuration of an image-pickup unit according to the first embodiment of the present invention.
Figure 2B:
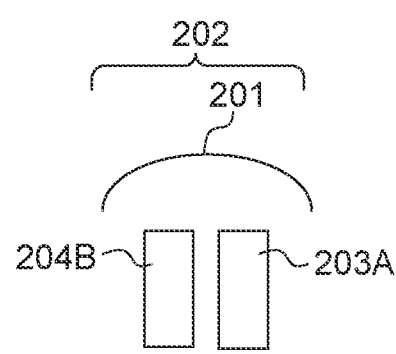

FIGS. 2A and 2B are explanatory views of the configuration of the image pickup unit 102 according to the first embodiment. FIG. 2A shows the configuration in arrangement of a plurality of pixels 202 included in the image pickup unit 102. As shown in FIG. 2A, the plurality of pixels 202 are two-dimensionally and regularly arranged in the directions of x and y (in a matrix). For example, Bayer arrangement can be adopted as an arrangement pattern. FIG. 2B is a sectional view of the structure of each pixel 202. The pixel 202 includes a microlens 201 and a pair of photoelectric conversion units 203A and 204B. The microlens 201 guides a light beam ejected from the optical system 101, to the photoelectric conversion units 203A and 204B. The photoelectric conversion units 203A and 204B each photoelectrically convert the incident light beam, to generate an electric signal.

Figure 3:
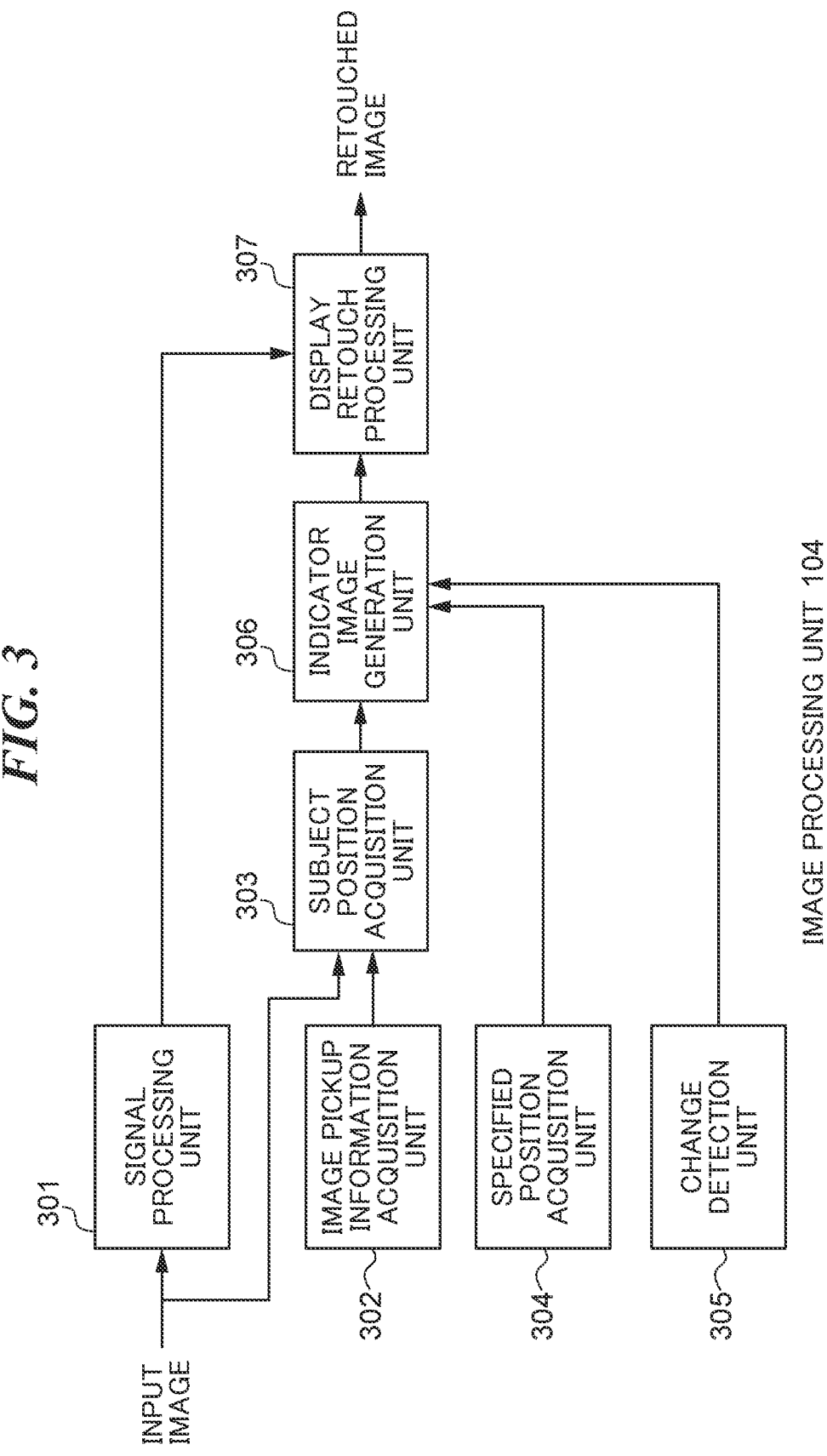
FIG. 3 is a configuration block diagram of functional blocks included in an image processing unit according to the first embodiment of the present invention.

FIG. 3 is a configuration block diagram of functional blocks included in the image processing unit 104 according to the first embodiment. The image processing unit 104 includes a signal processing unit 301, an image pickup information acquisition unit 302, a subject position acquisition unit 303, a specified position acquisition unit 304, a change detection unit 305, an indicator image generation unit 306, and a display retouch processing unit 307.

The signal processing unit 301 performs the ordinary signal processing (e.g., noise reduction processing and development processing) described above, to the picked-up image.

The image pickup information acquisition unit 302 acquires information about the image pickup apparatus 100 (image pickup information). The image pickup information is information including apparatus settings, such as the pitch length of the image sensor and the F-number of the lens (optical system 101), saved in the nonvolatile memory 109, and image pickup conditions, such as the aperture value and shutter speed controlled at the time of image picking-up.

The subject position acquisition unit 303 acquires (calculates) the three-dimensional position of a point on the subject, on the basis of the phase difference between a plurality of subject images generated by light beams from mutually different pupil regions of the optical system 101. A specific acquisition method (calculation method) will be described below.

On the basis of coordinate information about two points on the picked-up image input (selected) by an operation of the user through the operation unit (subject specification unit) 108, the specified position acquisition unit 304 acquires, as specified positions, the coordinate information (three-dimensional positional information) about the two points on the subject in the picked-up image, specified by the user. It should be noted that, in a case where the subject position acquisition unit 303 has not been able to calculate the three-dimensional positions of the specified two points, the specified position acquisition unit 304 may estimate the three-dimensional positional information about each point, on the basis of the three-dimensional position of another point in a region (space) including each point whose three-dimensional position has not been calculated. "Another point in a region (space) including each point" is preferably another point around each point (within a predetermined distance) (hereinafter, the same applies).

The change detection unit 305 compares information about the past image pickup apparatus 100 (past information) saved in the recording unit 107 and the nonvolatile memory 109, with information about the current image pickup apparatus 100 (current information), to detect the change about the image pickup apparatus 100. For example, when the user operates the operation unit 108 and changes the enlargement ratio (display magnification) of the picked-up image that the display unit 106 causes the display to display, the change detection unit 305 compares the past enlargement ratio before the operation with the current enlargement ratio after the operation, to detect the change of the enlargement ratio by the display unit 106.

The indicator image generation unit 306 acquires the length between the two points specified by the user, and then generates an indicator image corresponding to the acquired length. The indicator image is an image indicating the absolute or relative length between the specified two points. In a case where the subject position acquisition unit 303 has not been able to calculate the three-dimensional positions of the specified two points, the indicator image generation unit 306 may estimate the length between the two points, on the basis of the three-dimensional position of another point in a region (space) including each point whose three-dimensional position has not been calculated. For example, the indicator image may be an image displaying a numerical value indicating the length, near a line segment having both end points at the specified two points, or may be a ruler image having graduations indicating a reduced scale. The ruler image may be an image simulant of an actual ruler (rule), or may be an image including a long line segment connecting the two points and a plurality of short line segments orthogonal to the long line segment, indicating graduations. It should be noted that, according to adoption of an image of a ruler having graduations corresponding to the length between the two points, as the indicator image, the user can measure the length of a portion located between the specified two points.

The display retouch processing unit 307 superimposes the indicator image generated by the indicator image generation unit 306, onto the picked-up image developed by the signal processing unit 301, to acquire a retouched image. The acquired retouched image is supplied to the display unit 106, so as to be displayed on the display.

Figure 4:
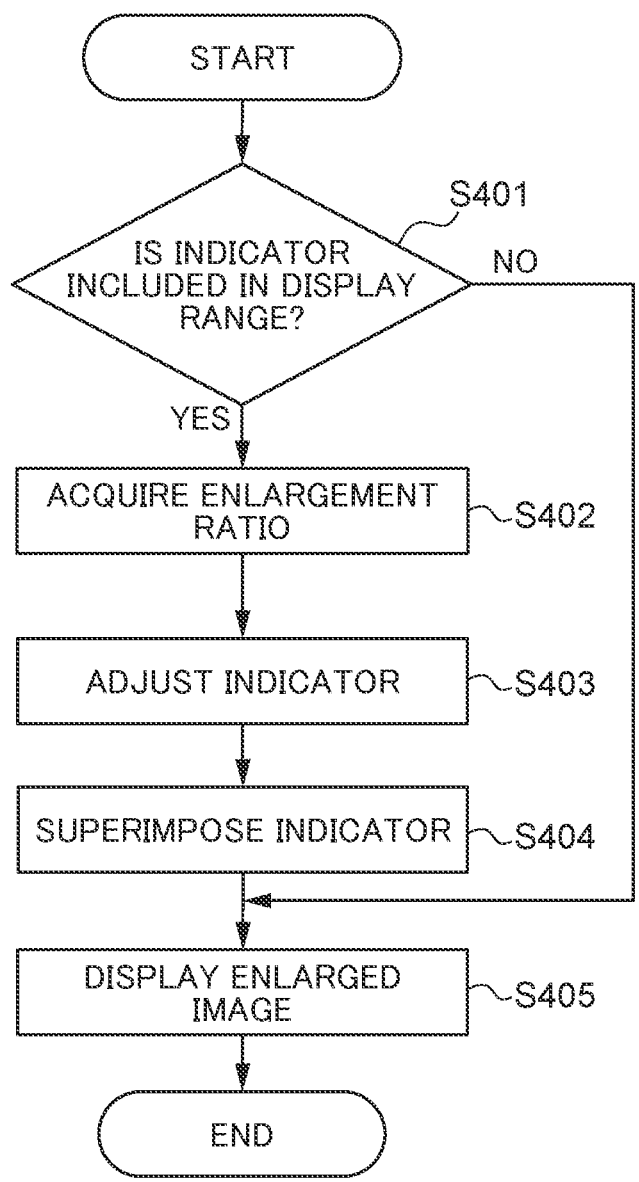
FIG. 4 is a flowchart showing image processing according to the first embodiment of the present invention.

FIG. 4 is a flowchart showing image processing according to the first embodiment. Image retouch processing when an enlargement operation is performed by the user while the user is viewing, on the display, the retouched image in which the indicator image indicating length information is superimposed on the picked-up image, will be described below. The user operates the operation unit 108 and performs an enlargement/reduction operation to give an instruction of enlargement processing of the retouched image, so that the image retouch processing shown in the flowchart of FIG. 4 starts. It should be noted that the "enlargement/reduction operation" is an operation of giving an instruction of enlargement processing or reduction processing.

Figure 5:
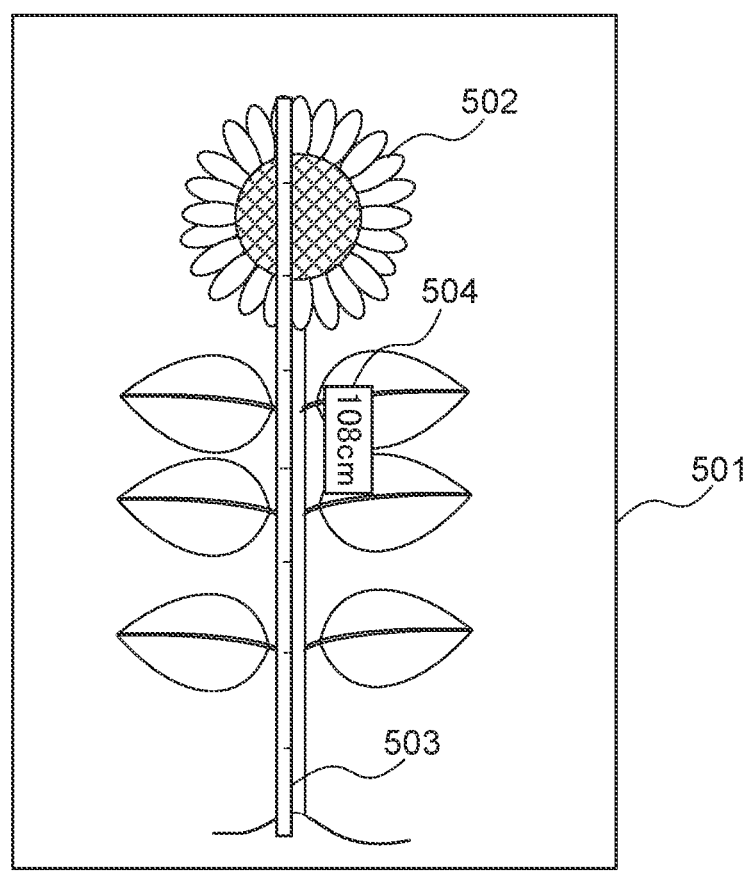
FIG. 5 is a view showing an exemplary retouched image according to the first embodiment of the present invention.

FIG. 5 shows an exemplary retouched image 501 according to the first embodiment. The retouched image 501 corresponds to the initial state in the present processing (state before enlargement), and includes the image of a plant 502 having flowered included in the picked-up image. Due to two points on the image of the plant 502 (upper end and lower end) specified by the user, a ruler image 503 having both ends at the two points and a measured-length value 504 between the two points are superimposed on the picked-up image as the indicator image.

At a step S401, the indicator image generation unit 306 determines whether the indicator image is included in the range of the retouched image 501 to be displayed by the display unit 106. In a case where the indicator image is not included in the display range (No at S401), the processing proceeds to a step S405 to be described below. On the other hand, in a case where the indicator image is included in the display range (Yes at S401), the processing proceeds to the next step S402.

At the step S402, the change detection unit 305 compares the display range of the retouched image 501 before the enlargement processing with the display range of the retouched image 501 after the enlargement processing, acquires (calculates) the enlargement ratio of the retouched image 501 by the enlargement processing, and detects the change of the enlargement ratio. It should be noted that, preferably, the enlargement ratio of the retouched image 501 is calculated individually for the longitudinal direction (vertical direction) and the lateral direction (horizontal direction).

At a step S403, the indicator image generation unit 306 adjusts the actual width that is the thickness on the image (actual thickness) of the ruler image 503 in the retouched image 501 such that the display width that is the shown thickness of the ruler image 503 (length in the short-side direction on display) does not increase after the enlargement processing. For example, the indicator image generation unit 306 multiplies the actual width of the ruler image 503 by the reciprocal of the enlargement ratio in the lateral direction corresponding to the short-side direction of the ruler image 503 so as to calculate a new actual width, and generates the ruler image 503 having the new actual width. The short-side direction is the direction orthogonal to a line segment connecting the specified two points (long-side direction of the ruler image). The indicator image generation unit 306 may adjust the actual width such that the region of the ruler image 503 in the image display region of the display is constant (maintained or unchanged) before and after the enlargement processing.

In the generation of the new indicator image after the enlargement processing, the indicator image generation unit 306 does not change the positions of both end points of the ruler image 503 from the positions of the two points on the picked-up image specified by the user. That is, even when the position of the subject on display changes before and after the enlargement operation of the retouched image 501, the positions of both end points of the ruler image 503 are maintained on the subject on which the two points specified by the user are located.

Figure 6:
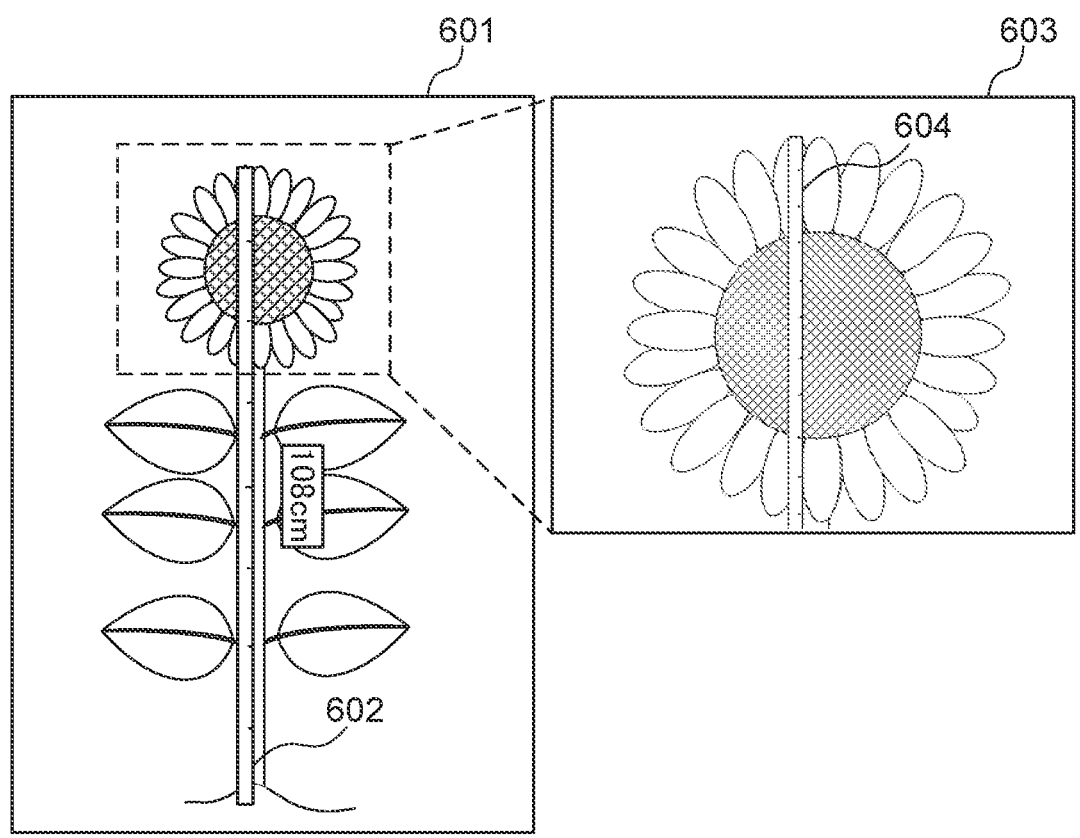
FIG. 6 is an explanatory view of the change of a ruler image (indicator image) before and after enlargement processing according to the first embodiment of the present invention.

FIG. 6 is an explanatory view of the change of the ruler image (indicator image) before and after the enlargement processing according to the first embodiment. In FIG. 6, a retouched image 601 corresponds to the retouched image 501 before the enlargement processing, and a retouched image 603 is a display image after the retouched image 601 is subjected to the enlargement processing. As shown in FIG. 6, the display width of a ruler image 604 after the enlargement processing is not larger than the display width of a ruler image 602 before the enlargement processing.

At a step S404, the display retouch processing unit 307 superimposes the new indicator image generated by the indicator image generation unit 306 at the step S403, onto the retouched image 501.

At a step S405, the display unit 106 causes the display to display the retouched image 501 after the enlargement processing. As a result of the step, the display unit 106 displays, on the display, the picked-up image enlarged in accordance with the changed display magnification, together with the indicator image having a size unchanged before and after the change in the direction orthogonal to the line segment connecting the specified two points. Accordingly, in a case where the retouched image 501 includes the indicator image, the retouched image 501 is to include the new indicator image re-retouched in accordance with the enlargement ratio instructed by the user, so that the display width of the ruler image to be displayed is unchanged before and after the enlargement processing. Therefore, even when the enlargement processing is performed, the subject on the display screen is inhibited from deteriorating in visibility.

Figure 7A:
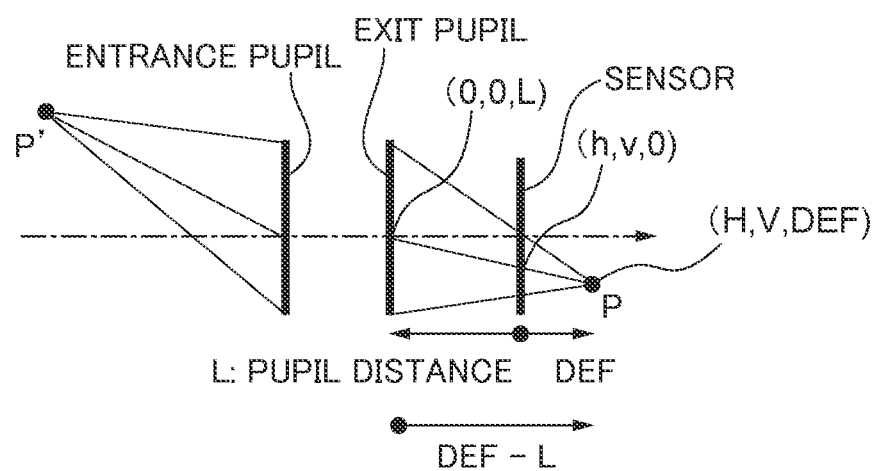
FIGS. 7A and 7B are explanatory views for acquisition of the three-dimensional position of a subject according to the first embodiment of the present invention.
Figure 7B:
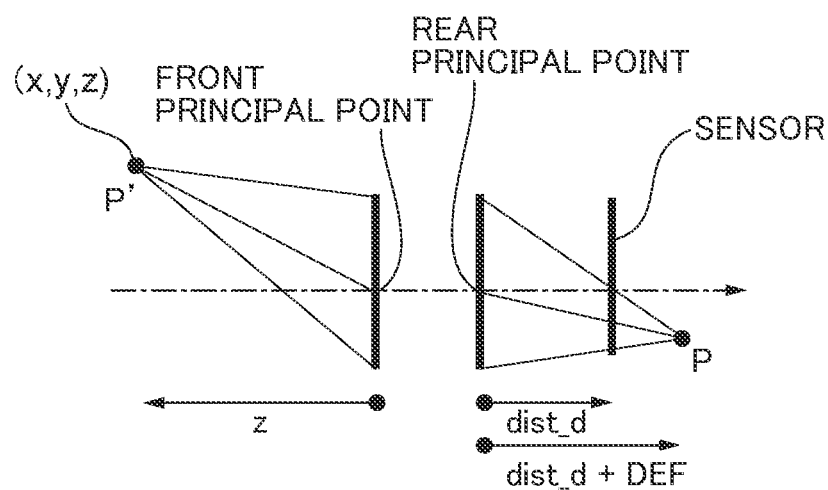

Acquisition of the three-dimensional position of the subject that the subject position acquisition unit 303 performs, will be described with reference to FIGS. 7A and 7B. Schematically, the three-dimensional position of the subject is acquired on the basis of the actual distance calculated from the amount of defocus.

The subject position acquisition unit 303 generates a defocus map indicating the distribution of defocus values in the picked-up image, on the basis of the phase difference between a plurality of subject images generated by light beams from mutually different pupil regions of the optical system 101. As a method for generating the defocus map, for example, a publicly known method disclosed in Japanese Laid-Open Patent Publication (kokai) No. 2016-9062 can be used. That is, the subject position acquisition unit 303 calculates the amount of defocus DEF every pixel 202, on the basis of the phase difference between correlation signals (A image signal and B image signal), to generate the defocus map.

Next, the subject position acquisition unit 303 calculates the actual distance z, on the basis of the amount of defocus DEF. The actual distance z indicating the distance from the front principal point of the image pickup apparatus 100 to point P' on the subject, is calculated every pixel 202 with the following Mathematical Expression (1). The distance dist_d from the rear principal point in the lens of the optical system 101 of the image pickup apparatus 100 to the sensor face and the focal distance f are included in the image pickup information that the image pickup information acquisition unit 302 acquires.

$$z=1/(1/(dist\_d+DEF)-1/f) \qquad \text{Mathematical Expression (1)}$$

Furthermore, on the basis of the actual distance z, the subject position acquisition unit 303 calculates the xy coordinates (x, y) in three-dimensional space of point P' on the subject, with the following Mathematical Expressions (2) and (3). The distance L from the image plane to the exit pupil is included in the image pickup information that the image pickup information acquisition unit 302 acquires.

$$(H,V)=(h,v)\times(1-DEF/L) \qquad \text{Mathematical Expression (2)}$$

$$(x,y)=(H,V)\times |z/(dist\_d+DEF)| \qquad \text{Mathematical Expression (3)}$$

where the coordinates (h, v) indicate the coordinates on the sensor of the focus point, and the coordinates (H, V) indicate the coordinates on the xy plane defocused from the coordinates (h, v) of the sensor face. As above, the three-dimensional position (x, y, z) of the subject can be calculated.

As described with reference to the accompanying drawings, according to the present embodiment, on the basis of the three-dimensional positional information about the specified two points of the subject in the picked-up image, the indicator image (e.g., ruler image) corresponding to the length between the two points is displayed in superimposition on the picked-up image. In a case where the enlargement ratio of the picked-up image (retouched image) being displayed is changed, a new indicator image is generated such that the display width of the indicator image (ruler image) is constant (maintained or unchanged) before and after the enlargement processing. Accordingly, the display width of the indicator image is inhibited from increasing along with the enlargement processing. Thus, the indicator image can be superimposed on the picked-up image, with the indicator image inhibited from deteriorating the visibility of the subject.

According to the present embodiment, in a case where the three-dimensional information about at least any one of the specified two points has not been acquired, on the basis of the three-dimensional positional information about another point around the at least any one of the two specified points whose three-dimensional information has not been acquired, the three-dimensional positional information about the at least any one of the two specified points or the length between the two points is estimated. Accordingly, even with the specified two points about which the three-dimensional information has not been acquired, the length between the two points can be estimated, so that the indicator image can be generated.

The first embodiment is varied variously. Specific varied aspects will be exemplified below. Two aspects or more selected optionally from the embodiment and the following exemplifications (including a second embodiment) are appropriately combined as long as there is no mutual inconsistency.

The generation of the indicator image at the time of the enlargement processing has been described above. The indicator image generation unit 306 may generate the indicator image such that the display width of the ruler image does not narrow when the reduction processing is performed. For example, the indicator image may be generated such that the display width of the ruler image is constant (maintained or unchanged) before and after the reduction processing. Alternatively, the indicator image may be generated such that the display width of the ruler image increases after the reduction processing. Accordingly, the ruler image to be displayed after the reduction processing is inhibited from narrowing excessively, so that the visibility of the ruler image is maintained.

The indicator image generation unit 306 may generate the ruler image (indicator image) whose graduations have a pitch set in accordance with the enlargement ratio or reduction ratio when the enlargement processing or reduction processing is performed. Accordingly, the pitch of the graduations of the ruler image to be displayed after the processing is appropriately set.

The indicator image generation unit 306 may generate the indicator image corresponding in size to the screen (image display region) of the display(s) on which the display unit 106 displays the image. The display(s) may be, for example, the display for a small-size finder and/or the relatively large rear liquid crystal display in the image pickup apparatus 100. Accordingly, the indicator image suitable in size to the screen of each display can be displayed on each display, so that any text and the graduations included in the indicator image are improved in visibility. Furthermore, the indicator image generation unit 306 may generate the ruler image whose graduations have a pitch corresponding to the size of the screen of the display. Accordingly, the pitch of the graduations of the ruler image can be appropriately set.

In the generation of the indicator image corresponding to the size of the screen (image display region) of the display as above, when detecting the change of the image display region of the display on which the retouched image including the indicator image is to be displayed, the change detection unit 305 acquires information about the screen size (region size). Then, on the basis of the acquired information, the indicator image generation unit 306 generates the indicator image as above.

The indicator image generation unit 306 may set the minimum value of the pitch of the graduations of the ruler image, on the basis of the accuracy of acquiring the three-dimensional position of the subject. For example, in a case where the amount of defocus DEF is zero and z/dist_d is 100, the coordinate x=h×100 is obtained in accordance with Mathematical Expressions (2) and (3). Here, h that is the pixel coordinate indicates a discrete value. In a case where the pitch of the graduations is smaller than the value of the pixel width centupled, the accuracy of length is unreliable. Therefore, preferably, the minimum value of the pitch of the graduations of the ruler image is set at h×100. Besides, the minimum value of the pitch of the graduations may be set on the basis of an error in calculation of the amount of defocus DEF, or may be set on the basis of the accuracy of acquiring any one or both of the two points specified by the user. Furthermore, the minimum value of the pitch of the graduations may be set on the basis of optical parameters, such as subject distance, subject contrast, and focal distance. Accordingly, the accuracy of the pitch of the graduations is reliable.

Figure 8:
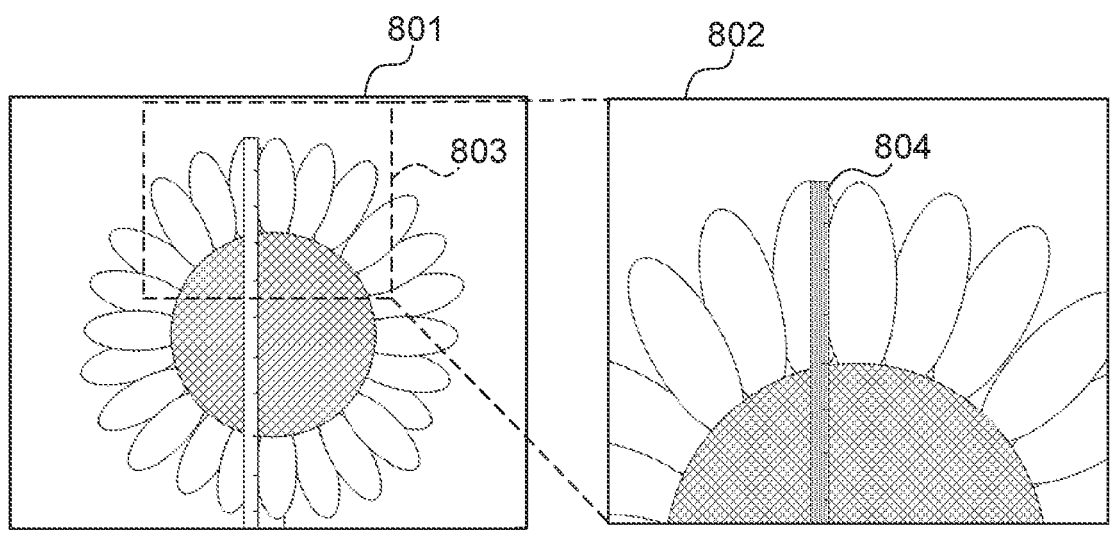
FIG. 8 is an explanatory view of a limit ruler image according to the first embodiment of the present invention.

In a case where the pitch of the graduations of the ruler image is set at the minimum value that is a limit value, the indicator image generation unit 306 may generate a limit ruler image indicating the case. The limit ruler image is different in feature from the ordinary ruler image in which the pitch of the graduations is not the minimum value. FIG. 8 shows screens 801 and 802, respectively, before and after the enlargement processing. A limit ruler image 804 whose graduations have a pitch set at the minimum value, is different in color from the ordinary ruler image. It should be noted that the limit ruler image 804 having a frame blinking can be adopted. Accordingly, the user can be notified of whether the current pitch of the graduations due to the accuracy of acquiring the three-dimensional position is the limit of accuracy of measuring length. As a result, the user takes an action, such as approach to the subject. Thus, a desired accuracy of measuring length can be achieved.

According to the first embodiment, the actual distance z is acquired on the basis of the phase difference between the subject images. Instead of this or in addition to this, another method for measuring distance may be adopted. For example, the image pickup apparatus 100 may be a compound-eye camera including a plurality of optical systems and a plurality of image pickup devices so that the shifted amount between images is detected with higher accuracy. Alternatively, the image pickup apparatus 100 may be a time-of-flight (TOF) camera or an ultrasonic camera that measures distance with ultrasonic waves so that the accuracy of measuring distance to the subject having a surface pattern that is monotonous is improved.

The image pickup apparatus 100 may include any one or both of an acceleration sensor or a gyroscope sensor. On the basis of positional information indicating the absolute position or relative position of the image pickup apparatus 100, acquired from such a sensor, the indicator image generation unit 306 may detect movement of the image pickup apparatus 100 (approach to the subject or movement away from the subject), to generate the indicator image corresponding to the detected movement. For example, in writing of the positional information about the image pickup apparatus 100 into the volatile memory 110 whenever necessary, the change detection unit 305 detects movement of the image pickup apparatus 100 in the positive optical-axis direction (forward), with reference to the volatile memory 110. When the specified position acquisition unit 304 acquires the position of the subject acquired before the movement of the image pickup apparatus 100, after the movement, the indicator image generation unit 306 generates the indicator image such that the length in the short-side direction on display of the ruler image is unchanged, on the basis of the approach of the image pickup apparatus 100 to the subject. Together with the processing, the pitch of the graduations of the ruler image can be set in accordance with the distance to the subject. Accordingly, even in a case where the user approaches the subject while holding the image pickup apparatus 100, the subject is inhibited from deteriorating in visibility, with no enlargement in the short-side direction of the ruler image. Conversely, but similarly in mechanism, on the basis of movement of the user holding the image pickup apparatus 100, away from the subject, the indicator image generation unit 306 does not necessarily generate the ruler image. Accordingly, an excessively small ruler image is inhibited from being superimposed on the picked-up image.

The image pickup information acquisition unit 302 may acquire information for use in calculation of the three-dimensional position, from a storage in the optical system 101 or from a storage in the image pickup apparatus 100. Besides, the image pickup information acquisition unit 302 may acquire the information for use in calculation of the three-dimensional information, added to the picked-up image, from the picked-up image saved in a storage.

The subject position acquisition unit 303 may calculate the three-dimensional position with the lateral magnification (horizontal magnification) of the optical system 101 of the image pickup apparatus 100.

Next, a second embodiment of the present invention will be described. In superimposition of the indicator image indicating a measured-length result onto the subject, when the subject to be measured in length moves or the subject corresponding to the indicator image is obstructed by another subject, the indicator image that no longer correspond to the subject remains on the display screen (namely, the indicator image unnecessary). According to the second embodiment, an indicator image is generated in accordance with a change in the position of a subject that a change detection unit 305 detects or a change about a specified position specified by a user (phenomenon, such as the specified position obstructed by another subject). In each following embodiment, elements equivalent in effect and function to those in the first embodiment are denoted with the same reference signs, and thus the respective descriptions thereof will be appropriately omitted.

Figure 9:
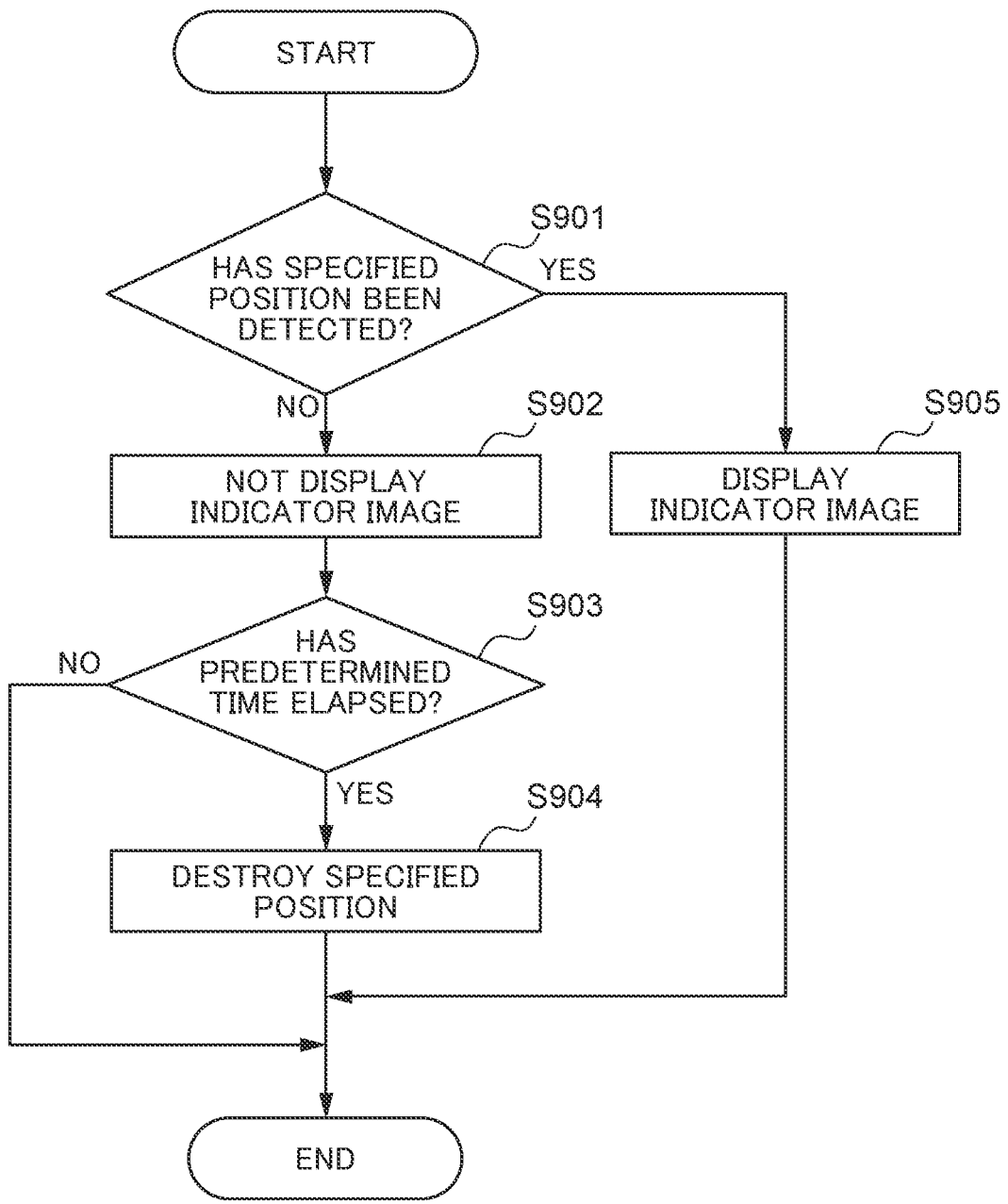
FIG. 9 is a flowchart showing image processing according to a second embodiment of the present invention.
Figure 10:
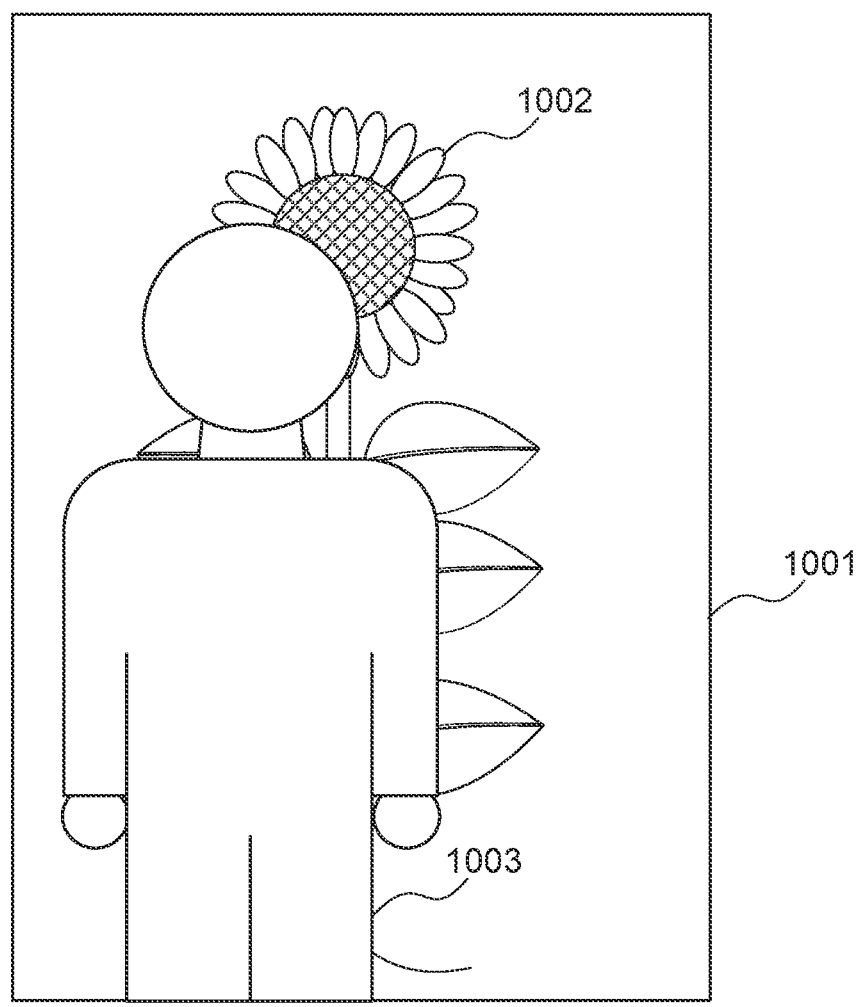
FIG. 10 is a view showing an exemplary retouched image according to the second embodiment of the present invention.

Generation of the indicator image according to the second embodiment will be described with reference to FIGS. 9 and 10. FIG. 9 is a flowchart of generation processing of the indicator image in a case where three-dimensional positional information about the specified position by the user is not detected (cannot be detected) due to arrival of another subject in front of the subject to be measured in length. The processing in the flow shown in FIG. 9 is repeated while a retouched image is being displayed on the display screen. For example, one time every frame, the processing in the flow of FIG. 9 is performed. It is assumed that, at the start of the flowchart of FIG. 9, a retouched image 501 similar to that of FIG. 5 is displayed on a display (EVF) by a display unit 106. A ruler image 503 and a measured-length value 504 are superimposed on the retouched image 501.

At a step S901, the change detection unit 305 determines whether a specified position acquisition unit 304 can detect the three-dimensional positional information about the specified position by the user in the next frame to be displayed on the display. For example, detection of the three-dimensional positional information about the specified position is achieved by template matching with a fragment image as follows. When the user specifies a position as the specified position, the specified position acquisition unit 304 stores the pixel index of the specified position (coordinate information) and the fragment image having the specified position centered, into, for example, a volatile memory 110. Typically, the image of the next frame is an image in which the image of the current frame is displaced infinitesimally. Therefore, when the image has no large change, correlation is high between the fragment image around the pixel index of the specified position and the picked-up image. When the image has a large change, the correlation is low. Therefore, preferably, the change detection unit 305 determines that the three-dimensional positional information about the specified position has been detected, in a case where the correlation value around the specified position acquired by template matching between the fragment image (past information) and the picked-up image (current information) is larger than a predetermined threshold. When the specified position is detected with the subject unchanged in position (Yes at S901), the specified position acquisition unit 304 updates the pixel index (coordinate information). Then, the processing proceeds to a step S905. On the other hand, when the specified position is not detected due to the subject changed in position (No at S901), the processing proceeds to a step S902.

A specific example in a case where the specified position is not detected due to the subject changed in position, namely, in a case where the correlation between the fragment image and the picked-up image decreases, will be described with reference to FIG. 10. FIG. 10 shows a scene image in which a human figure 1003 is located in front of a plant 1002 that is the subject. Because the human figure 1003 has interrupted the specified position by the user on the plant 1002 to the image pickup apparatus 100, the correlation value due to the template matching decreases discontinuously. As a result, the specified position acquisition unit 304 determines that the specified position is not detected (No at S901).

At the step S902, because of no detection of the specified position (namely, because of detection of a change in the position of the subject), an indicator image generation unit 306 generates no indicator image to be superimposed on the picked-up image. Thus, there is no indicator image to be superimposed on the picked-up image by a display retouch processing unit 307, resulting in no indicator image included in the image that the display unit 106 causes the display to display.

At a step S903, a control unit 105 determines whether a predetermined time has elapsed after the three-dimensional positional information about the specified position is first disabled from being detected at the step S901. Preferably, the determination is performed, for example, on the basis of a no-detection flag set when the three-dimensional positional information about the specified position is first disabled from being detected. In a case where the predetermined time has not elapsed (No at S903), the processing in the present flow finishes for the present frame, and subsequently the processing in the present flow is performed for the next frame. On the other hand, in a case where the predetermined time has elapsed (Yes at S903), the processing proceeds to a step S904.

At the step S904, the specified position acquisition unit 304 destroys the pixel index of the specified position and the fragment image, and then the processing in the present flow for the present frame finishes.

At a step S905, the indicator image generation unit 306 generates the indicator image, in contrast to the step S902. Then, similarly to the first embodiment, the display retouch processing unit 307 superimposes the indicator image onto the picked-up image, and the display unit 106 causes the display to display the retouched image including the indicator image superimposed on the picked-up image.

As described above with reference to the accompanying drawings, according to the present embodiment, in a case where the three-dimensional positional information about the specified position by the user is not detected, the indicator image generation unit 306 generates no indicator image, resulting in elimination of the indicator image unnecessary from the display image. Therefore, the subject on the display screen can be improved in visibility.

In a case where the specified position is re-detected within the predetermined time after no detection of the three-dimensional positional information about the specified position, the indicator image generation unit 306 re-generates the indicator image, so that the indicator image is re-superimposed on the picked-up image. Therefore, in a case where the period of no detection of the specified position is short (for example, in a case where a moving object passes in front of the image pickup apparatus 100 or in a case where halation occurs at the specified position due to, for example, ambient light), the specified position is maintained. Thus, the user does not need to re-specify the specified position and the operation is inhibited from being troublesome, so that the convenience for the user can be improved. On the other hand, in a case where the specified position is not detected after the predetermined time elapses, the information about the specified position is destroyed, so that the determination processing is inhibited from continuing to the specified position already unnecessary. Therefore, reduction of processing load and inhibition of false detection based on the specified position unnecessary are achieved.

According to the second embodiment, a switch between display and non-display is made to the indicator image, on the basis of whether the three-dimensional positional information about the specified position by the user is detected. However, a switch between display and non-display may be made to the indicator image in accordance with other changes as exemplified below.

For example, the indicator image generation unit 306 may determine whether to generate the indicator image, on the basis of a change in positional information or attitude information about the image pickup apparatus 100 itself, detected by the change detection unit 305. The positional information can be acquired by, for example, a sensor that detects movement of the image pickup apparatus 100, an acceleration sensor, or a gyroscope sensor. Preferably, the change detection unit 305 determines whether change has occurred in the image pickup apparatus 100, on the basis of whether the difference (change) between the positional information or attitude information when a position is specified as the specified position by the user (past information) and the current positional information or attitude information (current information) is larger than a predetermined threshold. With the difference below the predetermined threshold, the indicator image generation unit 306 continues generation of the indicator image. Accordingly, when the user changes the position or attitude of the image pickup apparatus 100 in order to shoot another scene, the indicator image is switched to non-display. Thus, the indicator image unnecessary is inhibited from being displayed, so that the subject on the display screen can be improved in visibility.

Besides, the user may operate an operation unit 108 and instruct the image pickup apparatus 100 such that the indicator image is switched between display and non-display. Accordingly, the user can select to enable or disable display of the indicator image at any timing, so that the convenience for the user can be improved.

In addition, the image pickup apparatus 100 may be equipped with an input unit that inputs various parameters (e.g., size, transparency, and color) about display of the indicator image so that the user can flexibly adjust the method for displaying the indicator image. The operation unit 108 may serve as the input unit. Accordingly, in a case where text is small in the indicator image, the user can enlarge the size of the indicator image so as to view the text more easily. The user can increase the transparency of the ruler image so as to verify the portion of the subject measured in length (portion measured in length), more easily. Furthermore, in a case where the color of the subject and the color of the indicator image are similar, the user can adjust the color of the indicator image so as to distinguish between the subject and the indicator image, more easily.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

For example, the present invention can be achieved even when an external apparatus (e.g., computer) different from the image pickup apparatus 100, such as a camera, used to acquire the picked-up image, performs the entirety or part of each image processing in the embodiments described above.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-046165, filed Mar. 13, 2019, which is hereby incorporated by reference herein in its entirety.

What is claimed is:

1. An image processing apparatus for displaying a subject image including a subject on a display, comprising:
a memory device that stores a set of instructions; and
at least one processor that executes the set of instructions to:
specify two points of the subject in the subject image;
acquire three-dimensional positional information about the two points;
detect a change within the subject image;

generate an indicator image corresponding to a length between the two points and the change, based on the three-dimensional positional information and the change; and superimpose the indicator image onto the subject image, to acquire a retouched image.

2. The image processing apparatus according to claim 1, wherein the at least one processor executes the set of instructions to:

switch whether or not to generate the indicator image in accordance with an instruction from a user.

3. The image processing apparatus according to claim 1, wherein the at least one processor executes the set of instructions to:

adjust at least one of size, transparency, and color of the indicator image in accordance with an instruction from a user.

4. The image processing apparatus according to claim 1, wherein the at least one processor executes the set of instructions to:

estimate, in a case where three-dimensional positional information about at least any one of the two points has not been acquired, the three-dimensional positional information about the at least any one of the two points, based on three-dimensional positional information about another point in a space including the at least any one of the two points whose three-dimensional positional information has not been acquired.

5. The image processing apparatus according to claim 1, wherein the at least one processor executes the set of instructions to:

estimate, in a case where three-dimensional positional information about at least any one of the two points has not been acquired, the length between the two points, based on three-dimensional positional information about another point in a space including the at least any one of the two points whose three-dimensional positional information has not been acquired.

6. The image processing apparatus according to claim 1, wherein the at least one processor executes the set of instructions to:

adjust, when a change in an enlargement ratio of the subject image due to enlargement processing is detected, a length in a short-side direction of the indicator image superimposed onto the subject image so as to reduce a deterioration of visibility of the subject displayed on the display.

7. The image processing apparatus according to claim 1, wherein the at least one processor executes the set of instructions to:

adjust, when a change in an enlargement ratio of the subject image due to enlargement processing or a change in a reduction ratio of the subject image due to reduction processing is detected, a length in a short-side direction of the indicator image so as to maintain the length in the short-side direction of the indicator image before and after the enlargement processing or the reduction processing.

8. The image processing apparatus according to claim 1, wherein the indicator image is a ruler image with both ends at the two points, the ruler image having graduations based on the length between the two points.

9. The image processing apparatus according to claim 8, wherein the at least one processor executes the set of instructions to:

adjust, when a change in an image display region of the display on which the subject image is to be displayed is detected, intervals of the graduations on a basis of a size of the image display region after the change.

10. The image processing apparatus according to claim 1, wherein the at least one processor executes the set of instructions to:

generate the indicator image in a case where a change about a position of the subject is not detected, and not generate the indicator image in a case where a change about a position of the subject is detected.

11. The image processing apparatus according to claim 1, wherein the at least one processor executes the set of instructions to:

destroy information about the two points after a predetermined time has elapsed since the three-dimensional positional information failed to be acquired.

12. The image processing apparatus according to claim 1, wherein the at least one processor executes the set of instructions to:

determine, when a change in positional information or attitude information of the image processing apparatus is detected, whether to generate the indicator image, on the basis of the change in the positional information or the attitude information.

13. The image processing apparatus according to claim 1, wherein the at least one processor executes the set of instructions to:

generate the indicator image with a length in a long-side direction covering the length between the two points and a length in a short-side direction adjusted on the basis of the change, and adjust the length in the short-side direction of the indicator image superimposed onto the subject image so as to reduce a deterioration of visibility of the subject displayed on the display.

14. An image processing method for an image processing apparatus for displaying a subject image including a subject on a display, the image processing method comprising:

specifying two points of the subject in the subject image;
acquiring three-dimensional positional information about the two points;
detecting a change within the subject image;
generating an indicator image corresponding to a length between the two points and the change, based on the three-dimensional positional information and the change; and
superimposing the indicator image onto the subject image, to acquire a retouched image.

15. A non-transitory computer-readable storage medium storing a computer-executable program for executing an image processing method for an image processing apparatus for displaying a subject image including a subject on a display, the image processing method comprising:

specifying two points of the subject in the subject image;
acquiring three-dimensional positional information about the two points;
detecting a change within the subject image;
generating an indicator image corresponding to a length between the two points and the change, based on the three-dimensional positional information and the change; and
superimposing the indicator image onto the subject image, to acquire a retouched image.

* * * * *